L. GIBBS.

Plows.

No. 5,421. Reissued May 20, 1873.

WITNESSES.
Villette Anderson,
Chas. P. Steele

INVENTOR.
Lewis Gibbs,
Chipman Fosner & Co,
Attys.

A.M. PHOTO-LITHOGRAPHIC CO. N.Y. (OSBORNE'S PROCESS.)

UNITED STATES PATENT OFFICE.

LEWIS GIBBS, OF CANTON, OHIO, ASSIGNOR TO HIMSELF, JOHN R. BUCHER, AND WILLIAM A. WIKIDAL.

IMPROVEMENT IN PLOWS.

Specification forming part of Letters Patent No. 130,292, dated August 6, 1872; reissue No. 5,421, dated May 20, 1873; application filed March 15, 1873.

*To all whom it may concern:*

Be it known that LEWIS GIBBS, of Canton, in the county of Stark and State of Ohio, has invented certain new and useful Improvements in Plows; and that the following is a full, clear, and exact description thereof, sufficient to enable those skilled in the art to which the invention appertains to make and use the same, reference being had to the accompanying drawing making part of this specification, in which—

Figure 1:
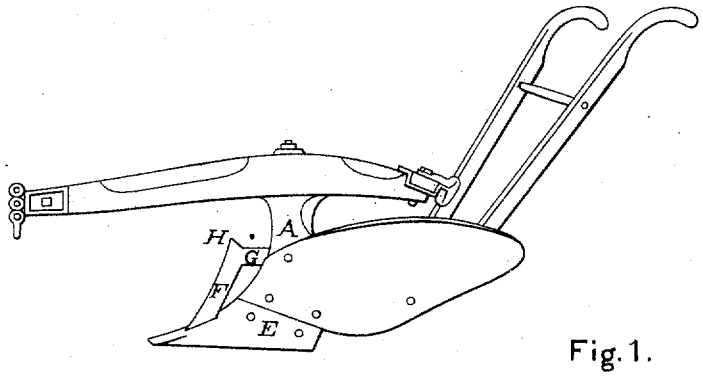
Figure 2:
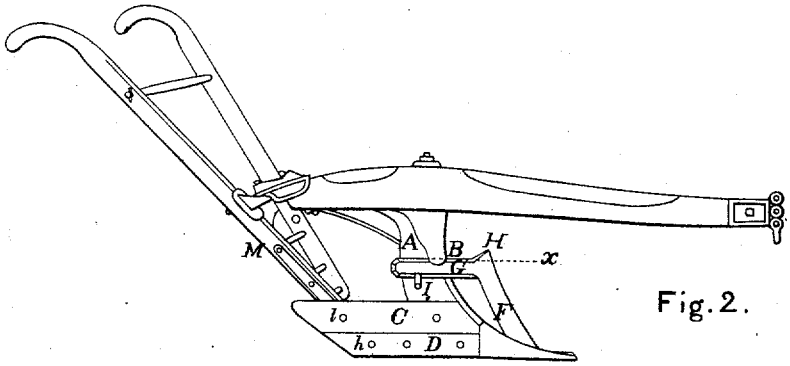
Figure 4:
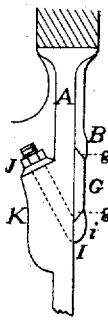
Figure 3:
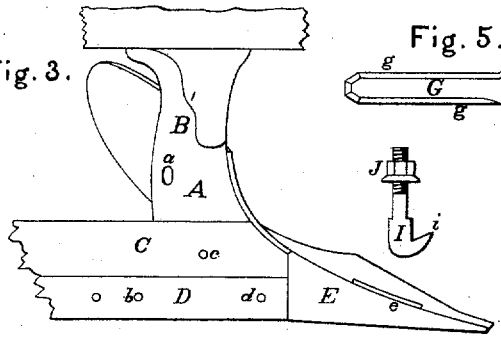
Figure 5:
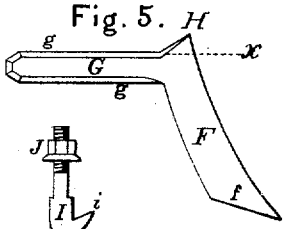
Figure 6:
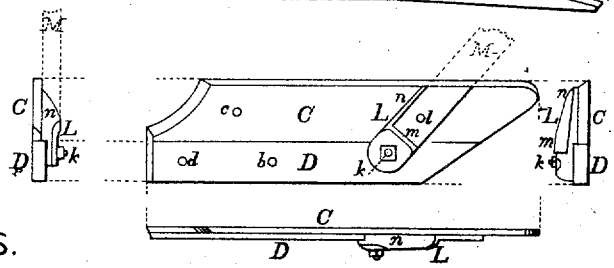

Figures 1 and 2 are furrow and land-side views of a plow embodying the invention. Figs. 3 and 4 are side and rear views of the standard, showing the colter attachments. Figs. 5 are views of the colter and clamping-bolt. Figs. 6 are front side, rear, and plan views of the land-side and attachments.

This invention relates to certain improvements in the construction and attachment of the colter, whereby it is firmly and substantially secured to the standard and share; and also to certain improvements in the construction. The invention consists in an elbow-colter with the edges of its longitudinal portion beveled off, the lower edge engaging with a hook-headed bolt and the upper edge with an overhanging lug on the standard, the bolt passing through the standard obliquely upward to the opposite side, where it is secured by a nut resting upon a nut-seat formed on a projection on the standard, the lower end of the cutting portion of the colter being inserted in a slot, *e*, in the share.

In the drawing, A represents the standard, on one side of which is cast an overhanging lug, B, the under side of which is beveled inward so as to form an acute-angled depression, as shown in Fig. 4. On the opposite side of the standard is an enlargement or projection, K, the upper side of which forms a seat for the nut J, which secures the bolt I. This bolt I has a hook-shaped head, *i*, and passes diagonally upward through the enlargement K, as shown in Fig. 4, so that, when in place, the head *i* forms, with the projection-lug B and the vertical side of the standard, a dovetail-shaped depression. The colter F has an arm, G, extending backward horizontally to the rear side of the standard. The upper and lower edges of this arm or shank G are beveled, as shown at *g g*, so that when the colter is in place the shank G fits the dovetailed depression formed by the bolt-head *i* and the lug B. The lower end *f* of the colter F is inserted in a slot or groove, *e*, in the share E near the point. The upper beveled edge *g* of the shank G is placed under the lug B, and the head *i* of the bolt I is hooked over the lower beveled edge *g* of the shank G, the bolt entering the hole *a* in the standard and passing obliquely upward to the seat K, where it is fastened by the nut J, thus holding the colter rigidly and securely in position. The colter F G has a triangular extension, H, formed at the upper corner above the line *x*, shown in Figs. 2 and 5, so that any sod or stubble which rises up on the colter toward the beam will pass back and drop down when it reaches the point H, and by so dropping will be sufficiently loosened to be readily drawn off by the furrow instead of hanging on the colter and obstructing the operation of the plow.

In the manufacture of plows it is customary to make the land-side in two pieces, for the reason that the lower portion is usually worn out before the upper portion is injured; and by making it in two pieces the lower piece can be replaced without the necessity of replacing the upper one. Considerable difficulty is sometimes experienced in getting the plow-handle M and land-side pieces C D firmly secured together, especially when either part is replaced by a new one. To obviate this difficulty the detachable handle-piece L is used. It consists of a plate formed with a base-flange, *m*, against which the lower end of the plow-handle rests, and an upper flange, *n*, which receives the upward-tending strain, said plow-handle M fitting against the flanges *m n*, as shown in Fig. 6. The plate L fits up against the pieces C D of the land-side, and is secured to the lower piece D by the bolt *k*, while the bolt *l* passes through the upper piece C, plate L, and handle M, thus securing the handle and land-side pieces firmly together, strengthening and preventing splitting of the handle, and enabling the land-side pieces to be removed and replaced independently of each other and of the handle.

What we claim as new, and desire to secure by Letters Patent, is—

1. A plow-standard having on its inner side the enlargement or projection K provided with an upward diagonal bolt-hole, its upper side forming a seat for the bolt-nut, substantially as specified.

2. The bolt I with the hook-shaped head *i* at its lower end, forming, with the lug B of the standard, a dovetailed depression for the reception of the colter-arm, substantially as shown and described.

3. The standard A, when constructed with the overhanging colter-lug B and inclined nut-seat K, substantially as and for the purpose specified.

In testimony that we claim the above we have hereunto subscribed our names in the presence of two witnesses.

LEWIS GIBBS.
JOHN R. BUCHER.
WILLIAM A. WIKIDAL.

Attest:
C. L. RUFSNIDER,
JNO. W. WAGNER.